United States Patent [19]

Soshi et al.

[11] Patent Number: 5,532,775
[45] Date of Patent: Jul. 2, 1996

[54] CAMERA WITH FILM FEED CORRECTION

[75] Inventors: Isao Soshi, Hatsudai; Hidenori Miyamoto, Urayasu; Toshiyuki Nakamura, Tokyo, all of Japan

[73] Assignee: Nikon Corporation, Tokyo, Japan

[21] Appl. No.: 418,135

[22] Filed: Apr. 10, 1995

Related U.S. Application Data

[63] Continuation of Ser. No. 124,773, Sep. 22, 1993, abandoned.

[30] Foreign Application Priority Data

Sep. 22, 1992 [JP] Japan .................................. 4-253236

[51] Int. Cl.$^6$ .................................................. G03B 17/36
[52] U.S. Cl. ........................................ 354/106; 354/173.1
[58] Field of Search ......................... 354/173.1, 173.11, 354/105, 106

[56] References Cited

U.S. PATENT DOCUMENTS 4,482,227  11/1984  Shiozawa et al. .................. 354/173.11

FOREIGN PATENT DOCUMENTS 2518769  12/1981  France .

OTHER PUBLICATIONS

Patent Abstracts of Japan, vol. 14, No. 66 (P-1003) 7 Feb. 1990 & JP-A-01 287 649 (Minolta) 20 Nov. 1989.
Patent Abstracts of Japan, vol. 4, No. 100 (P-19) 18 Jul. 1980 & JP-A-55 057 836 (Canon) 30 Apr. 1980.

*Primary Examiner*—David M. Gray

[57] ABSTRACT

A camera in which data, such as the date of photography, is recorded on film simultaneously with a film feed operation. A film feed control unit controls the feeding of film, and a data recording unit records data on the film. A pulse generator outputs a single train of pulse signals in synchronism with the film feeding action and these signals are used to control recording of data on the film, and to detect the end of film feed action for one frame of film. The camera also detects errors in the amount of film feed due to overrunning in the feeding of one frame. An overrun detection unit detects an amount of overrun based on the pulse signals, and compensates for the overrun during feeding of the next frame of film by subtracting the overrun amount from a standard feed amount. By subtracting the overrun amount from a normal feed amount for each film frame advance, errors in the amount of film feed due to the amount of overrunning are not accumulated.

18 Claims, 5 Drawing Sheets

CAMERA WITH FILM FEED CORRECTION

This application is a continuation of application Ser. No. 08/124,773, filed Sep. 22, 1993, now abandoned.

BACKGROUND OF THE INVENTION

1. Field of the Invention

The present invention relates to a camera which records data on film during a film feeding operation. More particularly, the present invention relates to a camera which corrects the film feed action in order that a single pulse generator may be used to determine a time for data recording and a time for stopping film feeding.

2. Description of the Related Art

Cameras are known which record the date of photography and similar data on film during a film feeding operation which occurs after a photograph has been taken. For example, a camera is disclosed in Japanese Laid-Open Patent Publication 63-27823 in which an array of light emitting elements (for example, LEDs) are driven to emit light simultaneously with the film feed action thereby causing data to be reproduced on the film as a succession of dot matrix characters. In these known types of cameras, pulse generators produce pulse trains which are used to detect a time when data may be recorded during feeding of the film, and the end of the action of feeding one frame of film. More specifically, in the known types of cameras two pulse generators are utilized: one pulse generator is used exclusively for detecting a time when data is to be recorded on the film during feeding of the film, and a second pulse generator is used exclusively for detecting the end of the action of feeding one frame of film.

A conventional type of pulse generator is illustrated in FIG. 1. The pulse generator includes a plurality of transmitting portions 12a and a plurality of non-transmitting portions 12b formed in adjacent sections on the inner periphery of a disk 10. A single non-transmitting portion 12c is formed on an outer periphery of the disk 10. The disk 10 is mounted on a free sprocket 14 of a film feeding system and is geared to rotate with the film feed action. A first photointerrupter 16 detects the non-transmitting portions 12b on the inner periphery of disk 10 and outputs a short period pulse train. A second photointerrupter 18 detects the single non-transmitting portion 12c on the outer periphery of disk 10 and outputs a long period pulse train. The short period pulse train is used to determine a time when data reproduction commences; the long period pulse train is used to determine when one frame of film has been fed. After the action of feeding the film by one frame has begun, when the number of pulses output by the first photointerrupter 16 reaches a predetermined number corresponding to the data reproduction commencement time, reproduction of the data takes place. Dot matrix characters are formed on the film by means of light generated by LEDs used for data reproduction. During data reproduction, the LEDs are driven on both the rising and falling edges of pulses generated by the photointerrupter 16 in order to produce characters of satisfactory precision. When the number of pulses output from the second photointerrupter 18 has reached a number corresponding to the feeding of one film frame, the operation of film feeding is stopped.

Pulse sequences of different periods have been used in conventional types of cameras because in a data reproduction system in which data reproduction is performed at each reversal of the pulse signals (i.e., at both the rising and falling edges of a pulse), dot matrix characters of satisfactory precision are formed when the pulse period is short. On the other hand, when using a pulse sequence to detect an amount of film feed corresponding to one frame, a short pulse period results in excess pulses being output because of overrun of the film due to the inertia of the film feed system. As a result, when the pulse number at this time is accumulated for each film feed, it becomes impossible to take the required number of photographs, and a longer pulse period becomes desireable.

However, two pulse generators require extra parts and excessive space for mounting. The parts and the labor required for mounting increase, and as a result, the camera is larger and the production cost of the camera increases.

SUMMARY OF THE INVENTION

It is therefore an object of the present invention to provide a camera which is relatively small in size and relatively inexpensive.

It is a further object of the present invention to provide a camera which uses a single pulse generator to detect both a time for data recording and an end of a film feed operation.

Yet a further object of the present invention is to provide a camera in which the amount of overrun in the film feed operation is detected even though pulses of short period are used to accomplish this detection.

Still a further object of the present invention is to provide a camera in which errors in the amount of feed arising from film overrun are not accumulated, even though pulse signals of short period are used for detecting the end of the operation of film feeding.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Reference will now be made in detail to the present preferred embodiments of the invention, examples of which are illustrated in the accompanying drawings.

Figure 2:
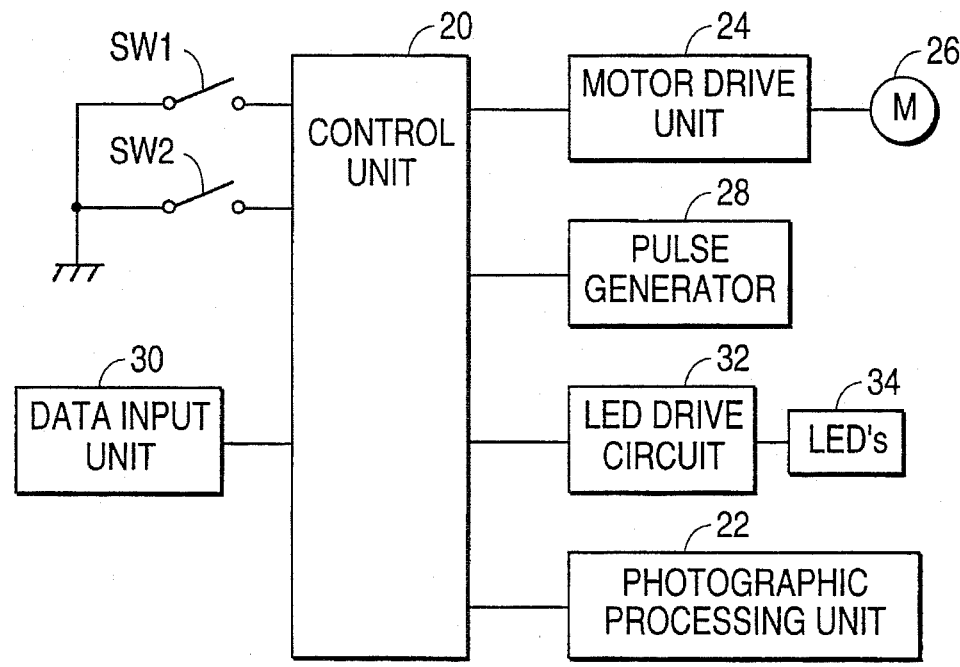
FIG. 2 is a block diagram showing a system for controlling film feed in a camera in accordance with the present invention.

FIG. 2 is a block diagram showing a system for controlling a camera in accordance with a present embodiment of the invention. A control unit 20 includes a CPU and performs control of the camera operation. Two switches are connected to control unit 20. Switch SW1 is a half depression switch which is ON when a release button (not shown in the drawing) is half depressed. Switch SW2 is a full depression switch which is ON when the release button is fully depressed.

When the half depression switch SW1 is ON, photographic processing unit 22 calculates an exposure value in response to a photographic preparation instruction output from the control unit 20, and also calculates the distance of a photographic subject. When the full depression switch SW2 is ON, a photographing instruction is output from the control unit 20 to the photographic processing unit 22. The photographic processing unit 22, based on the calculated exposure value and the distance of the photographic subject, first drives a lens, a stop and a shutter (not shown in the drawing), and then performs the photographic operation.

A motor drive unit 24 drives a film feed motor (M) 26 in response to drive signals from the control unit 20. A film wind-up spool (not shown in the drawing) is coupled to an output shaft of the film feed motor 26. When the output shaft of the film feed motor 26 rotates normally, the film wind-up spool rotates the film to wind it by an amount proportional to its rotation angle, thereby forwarding the film. Furthermore, the film feed motor 26 has a brake (not shown in the drawing) built in to control its rotation. The operation of the brake is controlled by the control unit 20 via motor drive unit 24.

Figure 1:
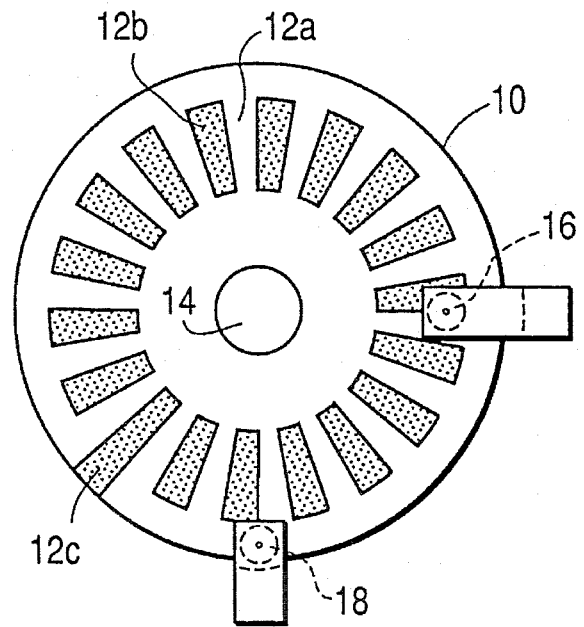
FIG. 1 is a schematic view illustrating a prior art pulse generator.
Figure 4:
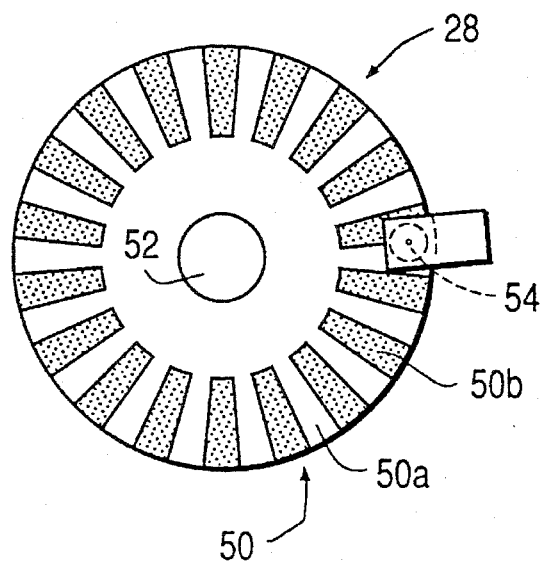
FIG. 4 is a schematic view illustrating a pulse generator in accordance with the present invention.

A pulse generator 28, which will be described in greater detail below with reference to FIG. 4, outputs pulses synchronously with the film feed operation. As shown in FIG. 4, the pulse generator 28 has a large number of transmitting portions 50a and adjacent non-transmitting portions 50b formed in a radial direction at a mutually equal pitch on the surface of a disk 50. Disk 50 is mounted on a free sprocket 52 of the camera film feed system and is rotated synchronously with the film feed action. Facing the disk 50, a single photointerrupter 54 detects the non-transmitting portions 50b and outputs a pulse train synchronously with the film feed action. According to this embodiment of the present invention, the number of pulses output when the film is accurately forwarded by one frame is fixed at 180 by the number of rotations of the disk 50 and the number of non-transmitting portions 50b.

Referring now to FIG. 2, a data input unit 30 inputs reproduction data, such as the date of photography and like data, to the control unit 20. The control unit 20 outputs reproduction signals to an LED drive circuit 32 based on the data input from the data input unit 30 and the pulse signals from the pulse generator 28. The LED drive circuit 32 drives LEDs 34 based on these reproduction signals, and the repetition of the light output by the LEDs 34 synchronously with the film feed action causes the input data to be reproduced onto the film surface as a succession of dot matrix characters.

Figure 3:
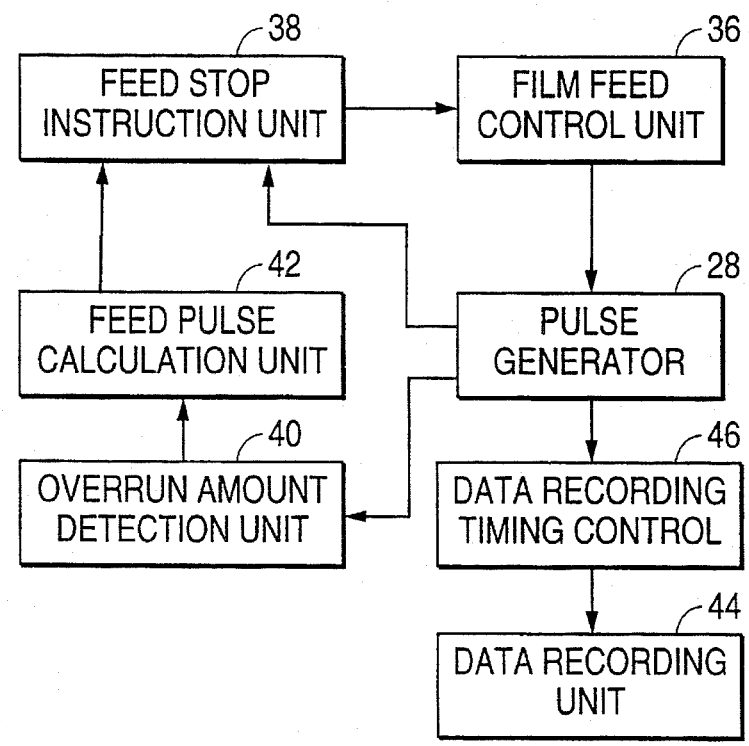
FIG. 3 is a block diagram showing the control system of FIG. 1 in greater detail.

FIG. 3 is a block diagram illustrating in greater detail certain constituent components of the control system shown in FIG. 2. The control unit 20 of FIG. 2 includes a feed stop instruction unit 38, an overrun amount detection unit 40, a feed pulse calculation unit 42, and data recording timing control 46. Data recording unit 44 includes LED drive circuit 32 and LED's 34. Film feed control unit 36 includes motor drive unit 24 and film feed motor 26.

The film feed control unit 36 controls the operation of feeding the film, and pulse generator 28 outputs pulse signals synchronously with the operation of feeding the film. In order to stop film feed after one frame has been advanced, film stop instruction unit 38 instructs the film feed control unit 36 to stop the feeding of film when the number of pulses received from the pulse generator 28 has reached a prescribed feed pulse number corresponding to a feed amount of one frame.

The overrun amount detection unit 40 also receives pulses from the pulse generator 28 and counts the number of pulses output by the pulse generator unit 28 during a time span beginning with the generation of a feed stop instruction from the feed stop instruction unit 38, and ending when the film stops. During this time span, there may be overrun of the film feed due to the inertia of the film feed motor 26. The feed pulse calculation unit 42 calculates a corrected feed pulse number by subtracting a standard pulse number corresponding to a normal amount of feed for one frame of film from the number of pulses detected by the overrun amount detection unit 40. This calculated feed pulse number compensates for the overrun amount, and is used the next time the film is forwarded. More specifically, the next time the film is forwarded by one frame, the feed stop instruction unit 38 instructs the stop of the feeding operation when the number of feed pulses detected equals the corrected feed pulse number. Here, the "normal amount of feed for one frame of film" means a combined value of a length which the image of one frame occupies in the feed direction of the film, and the length of a normal gap between one image and the next.

The data recording unit 44 records data on the film during feeding under control of the data recording timing control unit 46. Data recording timing control unit 46 controls the timing of the recording of data by the data recording unit 44 based on pulse signals from the pulse generator 28. Specifically, when the number of pulses output by the pulse generator 28 reaches a predetermined number corresponding to a time to begin data recording, data recording unit 44 is driven by the data recording timing control unit 46, and data are successively recorded.

Figure 5A:
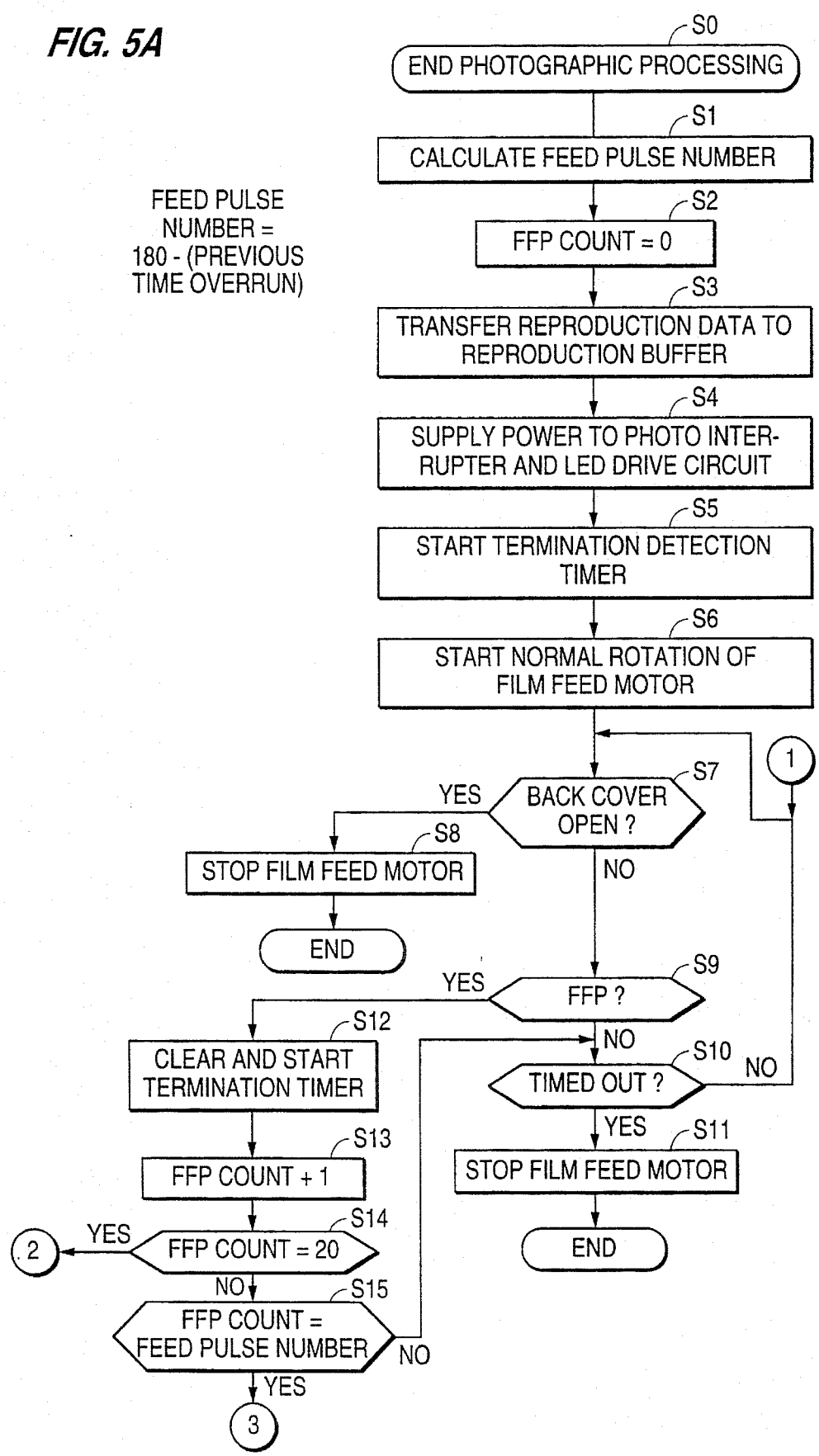
FIGS. 5A–5C are flowcharts showing an example of a control routine for controlling data reproduction and film feeding in accordance with the present invention.
Figure 5B:
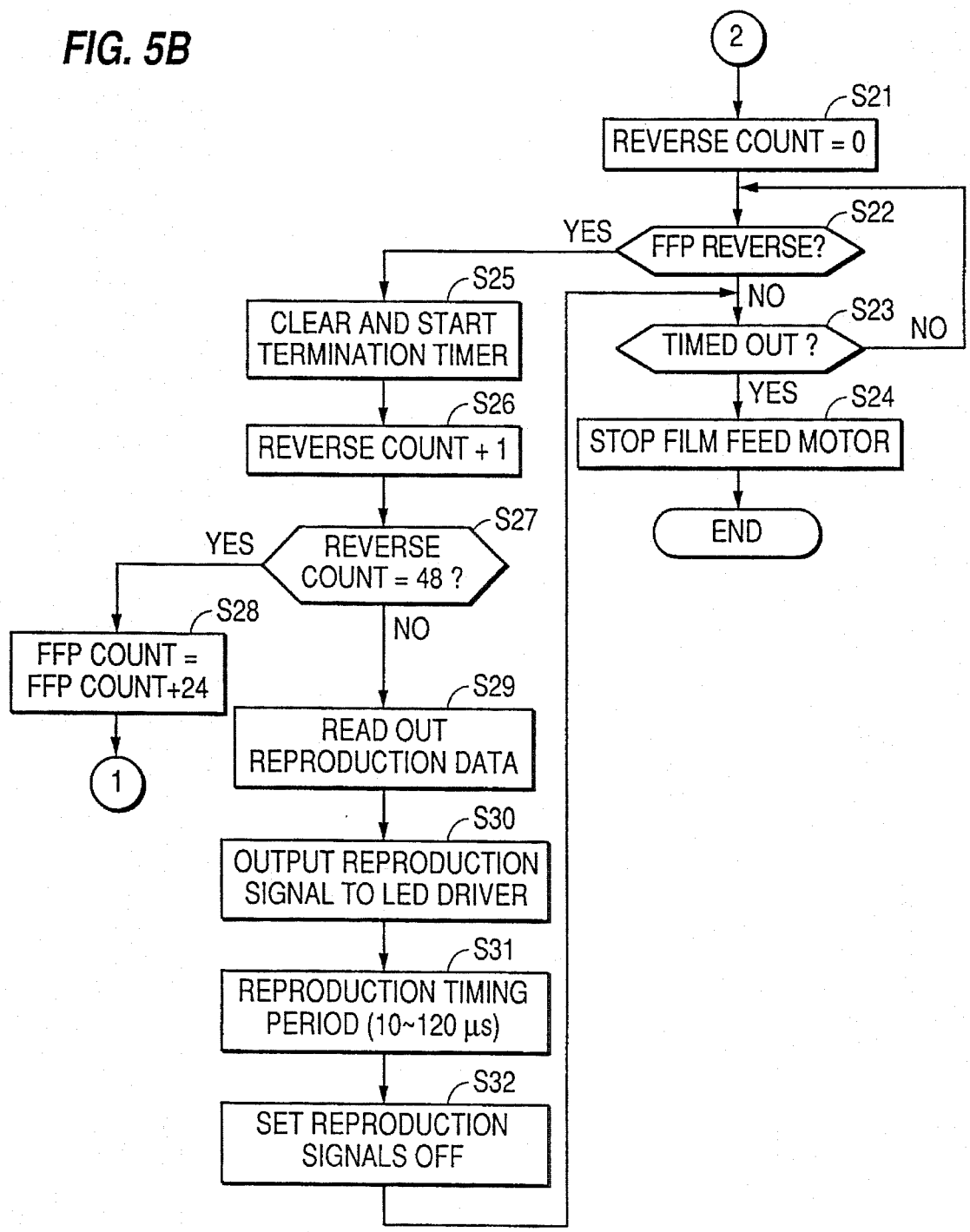
Figure 5C:
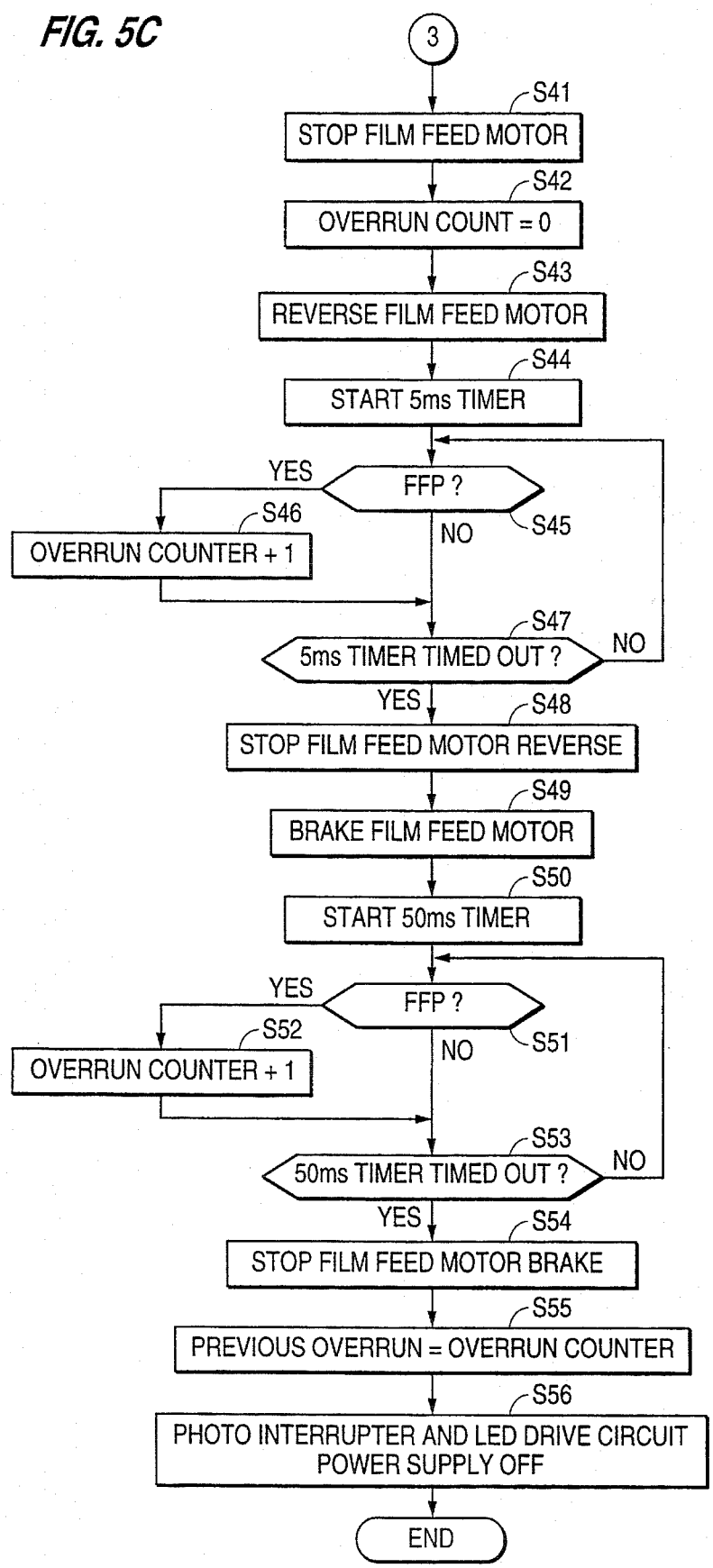

FIGS. 5A through 5C are flow charts showing an example of a control program executed by control unit 20 in accordance with a present embodiment of the invention. Execution of the control program begins in step S0 when photographic processing by the photographic processing device 22 ends. In step S1, a feed pulse number for the next film advance is calculated. The feed pulse number is calculated based on a standard pulse number corresponding to the normal feed amount when the film is fed by one frame, previously input into the control unit 20, and on an overrun pulse number detected during the previous time the film was forwarded. In this example, as described above, the standard pulse number is fixed at 180. Furthermore, by way of example, if the overrun number of pulses was 5 the previous time the film was fed by one frame, the feed pulse number becomes 180−5=175 pulses. Moreover, when feeding the film for the first time, a previous initial value, which had been indicated the last time film was fed, is subtracted, as an average overrun number, from the standard pulse number.

In step S2, a film feed pulse count (hereinbelow the FFP count) is cleared. In step S3, reproduction data input to the control unit 20 by the data input unit 30 are transmitted to a copy buffer (not shown in the drawing) within the control unit 20 where the reproduction data is stored.

In step S4, power is supplied to the photointerrupter 54 and the LED drive circuit 32, and in step S5, a termination detection timer (not shown in the drawing) is started. The termination detection timer determines whether the end of a roll of film has been reached. In step S6, drive signals are output to the motor drive circuit 24, and normal rotation of the film feed motor 26 is commenced. Proceeding to step S7, a signal from a back cover open detection switch (not shown in the drawing) is detected and it is determined whether or not the back cover of the camera is open. When the back cover is determined to be open, the program proceeds to step S8, the film feed motor 26 is stopped, and the film feed action is ended.

However, if it is determined in step S7 that the back cover is closed, the program proceeds to step S9 where it is determined whether or not the film feed pulses (FFP) generated by the photointerrupter 54 have started. If the FFP have not started, proceeding to step S10 it is determined whether or not the termination detection timer has timed out indicating that the end of the film has been reached. When it is determined that the timer has not timed out, the program returns to step S7, and as long as the determination made in step S10 is not affirmative, step S7 and step S9 are repeated. When a determination is made in step S10 that the termination detection timer has timed out, proceeding to step S11, the film feed motor 26 is stopped thereby ending the film feed operation.

When the determination in step S9 indicates that the FFP have started, the program proceeds to step S12 and the termination detection timer is cleared and restarted. Next, in step S13, corresponding to the start of the FFP in step S9, 1 is added to an integrated value of the FFP count.

Continuing, in step S14, it is determined whether or not the time for beginning data reproduction has arrived. More specifically, it is determined whether or not the integrated value of the FFP count is equal to a number of pulses previously set which corresponds to a position to begin data reproduction. In this example, the number is set so that reproduction of data is commenced when the integrated value of the FFP count has become 20. When the number of pulses does not correspond to the position to begin reproduction (i.e., 20 pulses), the program proceeds to step S15, where it is determined whether or not the integrated value of the FFP count is equal to the feed pulse number calculated in step S1. Thus, in step S15 it is determined whether the end of the operation of feeding one frame has arrived. If the determination in step S15 is negative, the program branches to step S10.

However, when it is determined in step S14 that the number of film feed pulses corresponds to the position to begin data reproduction, the program proceeds to step S21 where a counter used to detect a data reproduction time is cleared. The count cleared in step S21 is referred to as a "reverse count" because it is a count of both the rising and falling edges of the FFP. In other words, a pulse count is made each time the edge of the pulse reverses. As noted above, characters of satisfactory precision are produced when LEDs are driven on both the rising and falling edges of pulses of short period. Proceeding to step S22, it is determined whether or not the FFP reverse pulses are detected. When it is determined that the FFP are not detected, proceeding to step S23, it is determined whether or not the termination detection timer has timed out. If the termination detection timer has not timed out, the program returns to step S22. When it is determined that the timer has timed out, proceeding to step S24, the film feed motor 26 is stopped and the film feed action ends.

When the FFP have been detected in step S22, the program proceeds to step S25 where the termination detection timer is cleared and restarted. Continuing, in step S26, an integrated value of the reverse count corresponding to a count of the FFP at both the rising and falling edges, is increased by 1. In step S27, it is determined whether or not the integrated value of the reverse count equals a predetermined number, which represents the reverse count from the commencement of data reproduction to the end. In this example, 48 is used as the predetermined number. When the integrated value of the reverse count equals the predetermined number (i.e., 48) indicating the end of the reproduction process, the program proceeds to step S28 where half the value of the integrated value of the reverse count (i.e. 24) is added to the integrated value of the FFP count. Step S28 adds a value representing the amount of film feed during data reproduction to the integrated value of the FFP count. It should be noted that half the value of the reverse count is added to the FFP count since the FFP count only occurs on one edge of the FFP, whereas the reverse count occurs on both edges. The program then branches to step S7.

In step S27, when it is determined that the integrated value of the reverse count is not equal to the predetermined number which indicates the end of data reproduction (i.e., 48 in this example), the control program then proceeds to step S29 where the reproduction data input to the buffer in step S3 are read out, thereby beginning the reproduction process. Next, in the step S30, reproduction signals are output to the LED drive circuit 32 and the desired LEDs 34 are driven to emit pulses of light. In step S31, emission of light by the LEDs 34 is continued for a time (in this example 10–120μs) which has previously been set and is dependent upon the sensitivity of the film being used. Proceeding to step S32, all the reproduction signals are set OFF and the program branches to step S23. The processing steps S29–S32 are repeated on each rising and falling edge of the FFP until the predetermined number (i.e., 48), indicating the end of data reproduction, has been reached. In this manner, dot matrix characters are produced in succession on the film surface during film feed.

When it has been determined in step S15 that the integrated value of the FFP counter is equal to the feed pulse number calculated in step S1, the control program proceeds to step S41 where the sequence of steps following step S41 act to stop the film feed motor 26, and to determine an amount of overrun for the film feed operation. In step S41, a motor stop instruction is output to the motor drive unit 24 instructing the film feed motor 26 to stop. Continuing in step S42, an overrun counter is cleared in order to detect the amount of overrun due to the inertia of the film feed system.

Proceeding to step S43, an instruction is output to the motor drive unit 24 which reverses the drive current to the film feed motor 26 in order to stop the motor 26. In step S44, a 5 ms timer is started for regulating the amount of time the drive current for the film feed motor 26 is reversed. Next, in step S45, it is determined whether or not the FFP are detected indicating that overrun of the film feed is occurring. When the FFP have been detected, the program proceeds to step S46, where 1 is added to the integrated value of the overrun counter, and the program proceeds to step S47. However, when it has been determined in step S45 that the FFP are not detected, the program proceeds directly to step S47. In step S47, it is determined whether the 5 ms timer has timed out. If it is determined that the timer has not timed out, the program returns to step S45 and the process of steps S45–S47 is repeated until step S47 is affirmative.

When it is determined in step S47 that the 5 ms timer has timed out, proceeding to step S48, the reversal of the supply of current to the film feed motor 26 is stopped. Continuing in step S49, a motor braking instruction is output to the motor drive unit 24 and a short brake of the film feed motor 26 is started. In step S50, a timer is started in order for the braking of the film feed motor 26 to be effected for up to a previously set time (in this example 50 ms). Next, in step S51, it is determined whether or not the FFP are detected, indicating that overrun of the film feed is still occurring. When it is determined that the FFP are detected, the program proceeds to step S52, and 1 is added to the integrated value of the overrun counter, and the program proceeds to step S53.

However, when it has been determined in step S51 that the FFP are not detected, the program proceeds directly to step S53. In step S53, it is determined whether or not the 50 ms timer has timed out. If it is determined in step S53 that the 50 ms timer has not timed out, the program returns to step S51 and the process of steps S51–S53 is repeated until step S53 is affirmative, indicating that the 50 ms timer has timed out.

If step S53 is affirmative, proceeding to step S54, the operation of braking the film feed motor 26 is stopped. Next, in step S55, in order to perform the calculation of the feed pulse number used in step S1 for the following film feed, the overrun pulse number used in step S1 is replaced with the integrated value of the overrun counter determined during the current film feed. Next, in step S56, the supply of current to the photointerrupter 54 and to the LED drive circuit 32 is stopped, and the film feed operation ends.

In summary, in the above processing sequence, after the commencement of the film feed, when the arrival for commencement of data reproduction makes S14 affirmative, the processing steps S29–S32 are repeated for each reverse of the FFP, and dot matrix characters are reproduced in succession on the film surface during the film feed.

When the film has been fed by the number of feed pulses required in step S1, step S15 is made affirmative, and in step S41 a film feed stop instruction is issued. The film feed action is then stopped by means of a motor reverse instruction in step S43 and a brake operation instruction in step S49. After step S41, until the film actually stops, pulses are output from the photointerrupter 54 due to overrunning, and the number of pulses is integrated in the overrun counter according to the amount of overrun while step S45 or step S51 is affirmative. The integrated value of the overrun counter is stored in step S55, and because it is subtracted from the standard pulse number in step S1 at the next film feed operation, the next film feed amount becomes smaller than the normal film feed amount for one frame by the overrun amount detected during the previous film feed. Accordingly, even if the film feed action is repeated, a cumulative error in the amount of film feed does not arise.

In the above described manner, even if the periodic pulse signals output from the pulse generator 42 are short, there is no accumulation of errors of film feed amounts due to overrunning, so that by means of pulse signals from a single pulse generator 28, the data reproduction time and the end time of the one frame film feed action can both be detected. Thus, according to the present invention, it is not necessary to use two kinds of pulse generation means and the camera is made smaller in size, and the production cost is reduced.

Moreover, the present invention has been described with respect to a single pulse generator 28 used for both a data reproduction system and a film feed system wherein the film is forwarded one frame at a time. However, the present invention is not limited, and can be applied to all cases in which a more accurate computation of a film feed amount is necessary other than a film feed amount of one frame of film.

Although a few preferred embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A camera comprising:
   (a) film feeding means for performing a film feed operation;
   (b) pulse generating means for generating a pulse train signal synchronously with the film feed operation; and
   (c) control means, responsive to said pulse train signal, for controlling said film feeding means to stop the film feed operation, and for detecting an overrun amount in the film feed operation, and for controlling the feeding of the film during a next film feed operation such that the film is fed by an amount which is different from a normal feed amount by the detected overrun amount.

2. The camera as claimed in claim 1, wherein said control means comprises:
   feed stop instruction means for determining a number of pulses output by the pulse generating means, and for instructing the film feeding means to stop the film feed operation when the number of pulses output by the pulse generating means reaches a predetermined number;
   overrun detection means for determining a number of pulses output by the pulse generating means during a time beginning from an issuance of a feed stop instruction from said feed stop instruction means and ending when the film feed stops; and
   feed pulse calculation means for calculating a number of film feed pulses for the next film feed operation by subtracting the number of pulses determined by the overrun detection means from a standard number of pulses corresponding to a normal feed amount.

3. A camera as claimed in claim 2, wherein the film feed operation advances film by one frame and a normal feed amount for one frame of film corresponds to a length which one frame of film occupies in the feed direction of the film and the length of a normal gap between one frame of film and a next frame.

4. A camera comprising:
   (a) film feeding means for performing a film feed operation;
   (b) data recording means for recording data on the film during the film feed operation;
   (c) pulse generating means for generating a single pulse train signal synchronously with the film feed operation; and
   (d) control means, responsive to said single pulse train signal, for controlling said data recording means to record data on film during the film feed operation, and for controlling the film feeding means to perform the film feed operation.

5. The camera as claimed in claim 4, wherein said control means comprises:
   feed stop instruction means for instructing the film feeding means to stop the film feed operation;
   overrun detection means for determining a number of pulses output by the pulse generating means during a time beginning from an issuance of a feed stop instruction from said feed stop instruction means and ending when the film feed stops;
   feed pulse calculation means for calculating a number of pulses for a next film feed operation by subtracting the number of pulses determined by the overrun detection means from a standard number of pulses corresponding to a normal feed amount; and data recording timing control means for controlling the timing of data recording.

6. The camera as claimed in claim 5, wherein said film feeding means includes a film feed motor and a drive unit for driving the film feed motor.

7. The camera as claimed in claim 5, wherein said data recording means includes data input means for inputting reproduction data into the camera, an array of LEDs, and an LED drive unit for driving the LEDs to record the input data on a surface of the film.

8. The camera as claimed in claim 5, wherein the film feed operation advances film by one frame and a normal amount of feed for one frame of film corresponds to a length which one frame of film occupies in the feed direction of the film and the length of a normal gap between one frame of film and a next frame.

9. A camera comprising:
 (a) film feeding means for performing a film feed operation;
 (b) pulse generating means for generating a single pulse train signal synchronously with the film feed operation;
 (c) data recording means for recording data on film during the film feed operation;
 (d) data input means for inputting the data which is recorded on the film during film feed operation;
 (e) data recording timing control means for instructing the data recording means to record data on the film when a number of pulses output from said pulse generating means reaches a first predetermined number;
 (f) feed stop instruction means for instructing the film feeding means to stop the film feed operation when a number of pulses output from said pulse generating means reaches a second predetermined number;
 (g) overrun detection means for detecting a number of pulses output from said pulse generating means during a time span beginning when said feed stop instruction means instructs said film feed control means to stop the film feed and ending when the film feed stops; and
 (h) feed pulse calculation means for calculating a number of film feed pulses for a next film feed operation, by subtracting the number of pulses detected by the overrun detection means from a standard number of pulses corresponding to a normal film feed amount.

10. The camera as claimed in claim 9, wherein the data recording means includes an LED drive circuit and LEDs which are driven by the LED drive circuit.

11. The camera as claimed in claim 9, wherein the film feeding means includes a film feed motor and a motor drive circuit for driving the film feed motor.

12. The camera as claimed in claim 9, wherein the film feed operation advances film by one frame and a normal feed amount for one frame of film corresponds to a length which one frame of film occupies in the feed direction of the film and the length of a normal gap between one frame of film and a next frame.

13. A camera comprising:
 (a) a film feeding device to advance film after a photographic operation, the film feeding device including
  (i) a film feed motor to advance the film; and
  (ii) a film feed motor drive circuit to drive the film feed motor;
 (b) a pulse generator connected to the film feed motor to generate a pulse train synchronously with a film feed operation; and
 (c) a control unit which receives the pulse signals and outputs a signal to stop the film feeding device when the received pulse signals equal a first predetermined number, and which determines an overrun amount in the film feed operation corresponding to a number of pulses detected from the pulse generator during a time beginning when the signal is output to stop the film feeding device and ending when the film feeding device stops, and which calculates a number of film feed pulses for a next film feed by subtracting the overrun amount from a standard number of pulses corresponding to a normal feed amount.

14. The camera as claimed in claim 13, wherein the control unit comprises:
 a feed stop instruction unit which receives pulses from the pulse generator and determines a number of pulses output by the pulse generator and outputs a signal to the film feeding device to stop the film feed operation when the number of signals output by the pulse generator reaches a predetermined number;
 an overrun detection unit which receives signals from the pulse generator and determines an overrun amount corresponding to a number of pulses output by the pulse generator during a time period beginning when the signal is output to stop the film feeding device and ending when the film feed stops; and
 a feed pulse calculation unit which calculates a number of film feed pulses for a next film feed operation by subtracting the overrun amount from a standard number of pulses corresponding to a normal feed amount.

15. A camera comprising:
 (a) a film feeding device to advance film after a photographic operation, the film feeding device including
  (i) a film feed motor to advance the film; and
  (ii) a film feed motor drive circuit to drive the film feed motor;
 (b) a data recording device for recording data on film, the data recording device including
  (i) an LED array to generate light; and
  (ii) an LED array drive circuit to drive the LED array;
 (c) a pulse generator connected to the film feed motor to generate a single pulse train synchronously with a film feed operation; and
 (d) a control unit which receives pulse signals from the pulse generator and signals the data recording device to record data on film during a film feed operation when a first predetermined number of pulses is received, and signals the film feeding device to stop film feed when a number of pulses received reaches a second predetermined number.

16. The camera as claimed in claim 15, wherein the control unit comprises:
 a data recording control unit which receives pulse signals from the pulse generator and outputs a signal to the data recording device to begin data recording when the number of pulses output by the pulse generator reaches the first predetermined number; and
 a film feed control unit which receives pulse signals from the pulse generator and outputs a signal to the film feeding device to stop the film advance when the number of pulses output by the pulse generator reaches the second predetermined number.

17. The camera as claimed in claim 16, wherein the film feed control unit further comprises:
 an overrun detection unit which receives pulses from the pulse generator and determines an overrun amount corresponding to a number of pulses detected during a period beginning after the signal to stop the film feed is output and ending when the film advance stops; and a feed pulse calculation unit to calculate a film feed pulse number for a next film feed operation by subtracting the overrun amount from a pulse number corresponding to a normal amount of film feed.

18. The camera as claimed in claim 14, wherein the film feed operation advances film by one frame and the normal amount of feed for one frame of film corresponds to a length which one frame of film occupies in the feed direction of the film, and the length of a normal gap between one frame of film and a next frame.

* * * * *